US009602787B2

(12) United States Patent
Blaser, Jr. et al.

(10) Patent No.: US 9,602,787 B2
(45) Date of Patent: Mar. 21, 2017

(54) CEILING MEDALLION PROJECTION SYSTEM

(71) Applicants: Robert Warren Blaser, Jr., Princeton, NJ (US); Lesley Rachel Blaser, Princeton, NJ (US)

(72) Inventors: Robert Warren Blaser, Jr., Princeton, NJ (US); Lesley Rachel Blaser, Princeton, NJ (US)

( * ) Notice: Subject to any disclaimer, the term of this patent is extended or adjusted under 35 U.S.C. 154(b) by 0 days.

(21) Appl. No.: 14/623,474

(22) Filed: Feb. 16, 2015

(65) Prior Publication Data

US 2016/0241823 A1   Aug. 18, 2016

(51) Int. Cl.
| | | |
|---|---|---|
| *H04N 9/31* | (2006.01) | |
| *G03B 21/14* | (2006.01) | |
| *G03B 29/00* | (2006.01) | |

(52) U.S. Cl.
CPC ........... *H04N 9/3144* (2013.01); *G03B 21/14* (2013.01); *G03B 29/00* (2013.01); *H04N 9/3141* (2013.01)

(58) Field of Classification Search
CPC ...... H04N 9/3144; H04N 9/3141; H04N 9/31; F21K 9/135; F21V 23/0435; F21V 23/0442; F21V 33/0052; F21V 33/0056; G03B 21/26; G03B 21/10; H04R 2420/07; H04R 1/028; H04R 2227/003; F21Y 2101/02; G09F 27/005; G09F 19/18; G09F 23/00
See application file for complete search history.

(56) References Cited

U.S. PATENT DOCUMENTS

| | | | | |
|---|---|---|---|---|
| 8,928,735 | B2 * | 1/2015 | Junuzovic | G03B 15/05 348/46 |
| 9,381,398 | B2 * | 7/2016 | Richardson | A63B 24/0021 |
| 2004/0160199 | A1 * | 8/2004 | Morgan | A01M 1/04 315/312 |
| 2012/0075864 | A1 * | 3/2012 | Nishi | F21V 29/02 362/294 |
| 2013/0002687 | A1 * | 1/2013 | Conti | F21V 23/0435 345/501 |
| 2014/0043544 | A1 * | 2/2014 | Kasuga | F21V 33/0052 348/744 |
| 2014/0049448 | A1 * | 2/2014 | Christensen | G09F 19/12 345/1.3 |

(Continued)

*Primary Examiner* — Brian P. Yenke
*Assistant Examiner* — Sean Haiem
(74) *Attorney, Agent, or Firm* — William D. Hare, Esq.; McNeely Hare & War, LLP (57) ABSTRACT

The ceiling medallion projection system is a means of housing and concealing a ceiling mounted high definition video projection system. The assembly is typically located between a pendant light fixture and the ceiling. It can be oriented to project imagery on a selected wall of the room. It is intended to be less conspicuous than a standard ceiling mounted projection system or video screen and requires little to no additional in-wall electrical service as it takes advantage of the electrical service already provided to the light. It is controlled wirelessly and can be linked to a router and any number of electrical devices including computers, handheld tablets and smart phones. It has audio capability as well. The system hosts applications that can provide reminders, messages, schedules and any other visual and audible information to assist the user in terms of organization, special needs, communication or entertainment.

17 Claims, 11 Drawing Sheets

(56) References Cited

U.S. PATENT DOCUMENTS

| | | | |
|---|---|---|---|
| 2014/0198949 A1* | 7/2014 | Garlington | G03B 21/10 |
| | | | 382/103 |
| 2015/0015797 A1* | 1/2015 | Garlington | G03B 21/10 |
| | | | 348/789 |
| 2015/0192283 A1* | 7/2015 | Chien | F21V 23/02 |
| | | | 362/227 |
| 2016/0269702 A1* | 9/2016 | Konno | H04N 9/3182 |

* cited by examiner

WALL MOUNTED
SWITCH ASSEMBLY

CEILING MEDALLION PROJECTION SYSTEM

CROSS-REFERENCE TO RELATED APPLICATIONS

This application claims priority from provisional patent application No. 61/940,396, filed on Feb. 15, 2014 and titled Intelligent Light Fixture and Projection Device, the contents of which are incorporated herein by reference in their entirety.

TECHNICAL FIELD OF THE INVENTION

The field of the invention generally relates to the housing and concealment of a ceiling mounted projection system. A projector with audio capability is created in the form of a modified ceiling medallion that also serves as a mounting apparatus and power/control for a pendant light fixture. The system is powered by existing electrical service that typically powers a ceiling mounted light fixture. It can communicate wirelessly with a router, a computer or a handheld electronic device such as a smart tablet or phone. Video input provided by such devices can be projected on a wall to provide a much larger image for multiple persons to see comfortably and conveniently. Audio input provided can be amplified by concealed speakers to improve sound quality. The system will host applications that can provide reminders, messages, schedules and any other visual and audible information to assist the user in terms of organization, special needs, communication or entertainment.

BACKGROUND

The system is designed, in part, to address the needs and desires of families and businesses to de-clutter and better organize their homes and offices, although many other applications are intended to be within the scope of the invention. We have all, to some degree, experienced the barrage of information that has cluttered modern life. We live among an array of schedules posted on sticky notes, "to do" lists, whiteboards, blackboards and calendars. On top of this, the virtual world has added laptops, handheld tablets and smart phones. Together with their respective power cords and chargers, such devices can clutter our lives as well.

Handwritten schedules and notes can be an eyesore and are often outdated. Personal electronic devices are wonderful, but are just that, "personal". They are perfectly convenient for an individual, but not ideal for a family or group. They can even isolate us from one another. Consider the image of a family dinner with everyone tuned separately to his or her handheld device. The medallion projector returns the "single conversation" to the family or group gathering, and embraces the wonderful aspects of technology and the information age.

Organizational tools are needed to assist families with an ADD/ADHD (Attention Deficit Hyperactivity Disorder) child, adults with ADD/ADHD, and those with Aspberger's Syndrome and other disorders that fall within the autism spectrum. As aforementioned, whiteboards, blackboards and post-it notes are great for "in your face" visibility, yet contribute to distracting clutter. They become "white noise" when not regularly updated. Smart phones, digital calendars and the various applications associated with them are brilliant, yet are not outright visible and require discipline for those who are "discipline challenged", often to the extreme. Such devices, in many cases, are also not suitable for children. As explained below, the invention described herein can provide useful assistance to families or individuals with ADD/ADHD or Aspberger's by implementing an improved means to organize and direct daily activities and the like.

Those with ADHD make up an expanding sector of the population. The CDC notes that "parents report approximately 9.5% or 5.4 million children 4-17 years of age have ever been diagnosed with ADHD as of 2007" and that "the percentage of children with a parent reported ADHD diagnosis increased by 22% between 2003 and 2007" (www.cdc.gov/ncbddd/adhd/data.html). While it is not clear how much of this is due to a rise in the condition and how much is due to a rise in the recognition of the condition, it is very clear that the population of those seeking assistance is growing, and rapidly. The invention described herein is believed to provide particular assistance to those with these conditions.

SUMMARY

The ceiling medallion projection system generally includes a projector packaged as a modified ceiling medallion from which a pendant light fixture can be suspended. The most typical application is within a dining area, kitchen or meeting room where a light fixture is already suspended above a table. The medallion projection assembly is simply installed between the light fixture and the ceiling typically requiring no additional in-wall wiring or electrical service. It can be oriented to project images on a chosen wall or surface (e.g., table, screen, wall).

The ceiling medallion projection system is inspired by an effort to better organize family and/or small group life, more efficiently and with less clutter. We are in the midst of a technical revolution that is vastly improving the quality of life for the individual. The ceiling medallion projection system strives to do the same for the family.

DETAILED DESCRIPTION

At the heart of most homes is a table. It may be within the breakfast nook of a kitchen or in a dining room. Coincidentally, above most of these areas is a ceiling hung light fixture. It is common for such a fixture to be suspended from a decorative medallion. In the past, many of these medallions were ornate plaster castings. In a general sense, the invention disclosed herein is a contemporary interpretation of such a casting modified to house a projector and associated equipment for operating the system of the invention. The system takes advantage of an existing power source for a ceiling mounted light fixture in the hub of the home. The system is located in a high position that is ideal for projecting without interference from people or objects. The existing light fixture and location can be maintained if desired. There is no need to cut into the ceiling or walls for additional wiring. In a preferred embodiment, the system is always ready for use, never has to be charged and there are no unsightly cords to trip over.

In a preferred application, the projector can post visual and audible reminders for everyone to see. It can be wirelessly linked to all personal electronic devices such that information can be better shared. A child, for example, can be encouraged to have a certain amount of ownership for his or her schedule. This is made difficult if the schedule is locked in a parent's small device.

Figure 8:
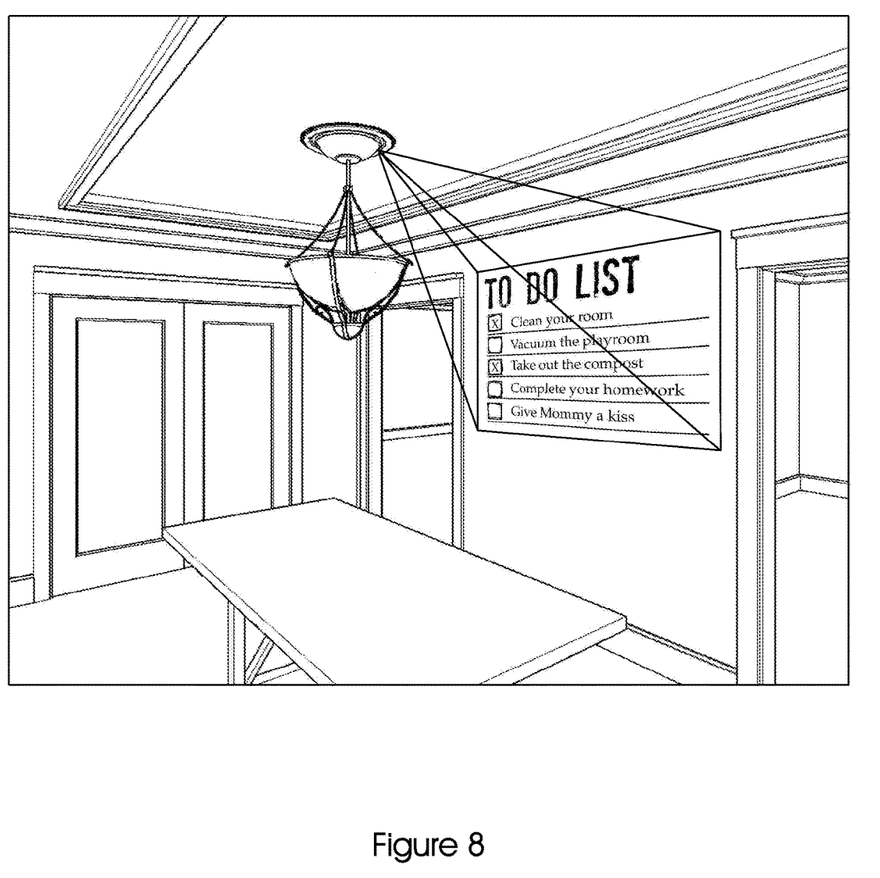
FIG. 8 is an additional rendered image showing an application of the projection system.

The projector can be a learning tool in other ways such as a teaching aid (FIG. 8). It can simply be a source of enjoyment as well. Perhaps it projects beautiful artwork during a meal, a favorite broadcast, or allows the family to share its day with loved ones far away via a video call.

The ceiling medallion projector invention also serves those with special needs. It can provide vibrant medication reminders for the elderly or disabled. Visually challenged persons can more easily see a large bright image. Certain daily reminders and/or familiar photographs can aid those who are memory challenged.

Figure 1:
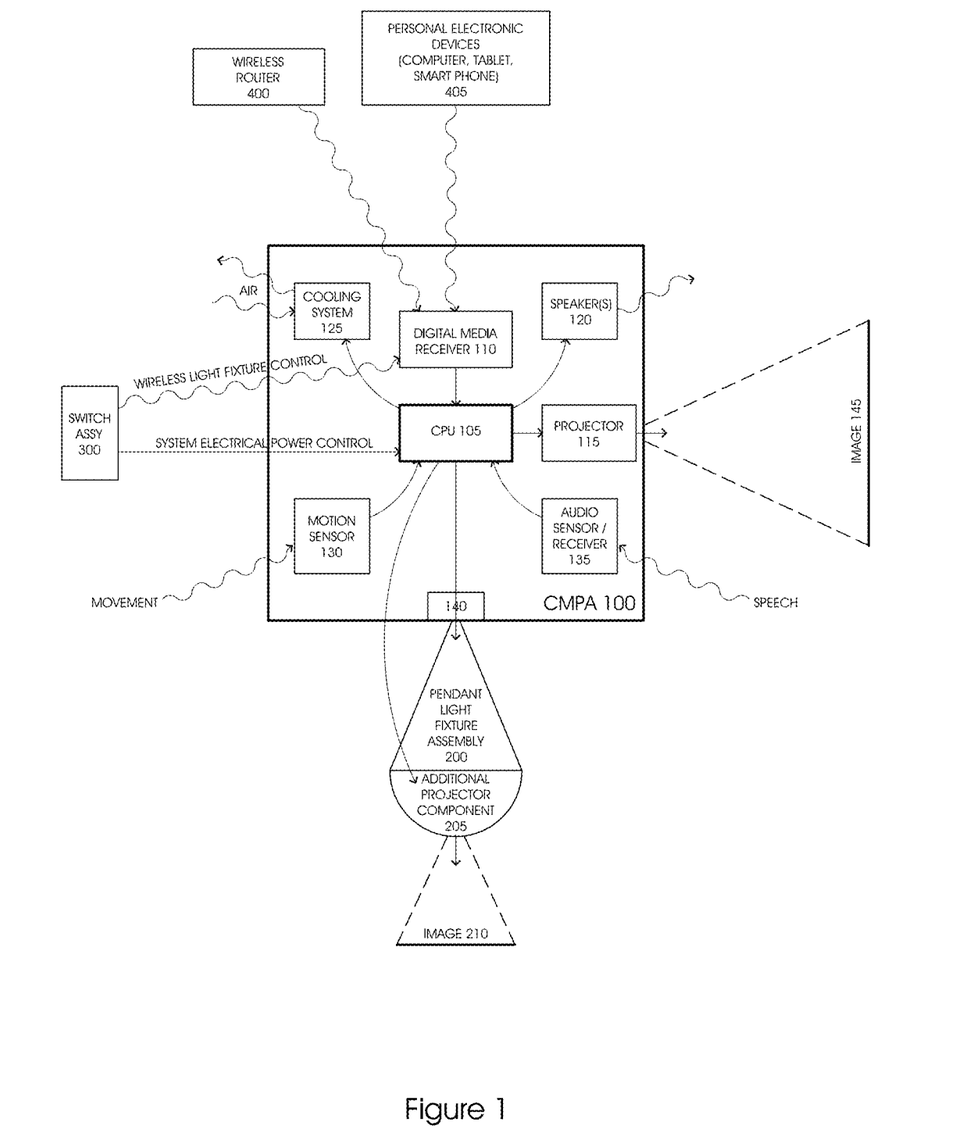
FIG. 1 is a system diagram indicating features, inputs and outputs related to the ceiling medallion projection assembly.

The ceiling medallion projection system is typically comprised of three assemblies, a ceiling mounted projection assembly (CMPA) 100, a light fixture assembly 200, and a switch assembly 300. A system diagram indicating features, inputs and outputs related to the ceiling medallion projection system is as shown in FIG. 1. The CMPA 100 is hard wired to the home/office electrical service via a junction box, which is commonly present in the ceiling where the light fixture is mounted to the ceiling. The pendant light fixture, in turn, is hard wired to the CMPA. The CMPA is comprised of a computer processing unit (CPU) 105 equipped with a wireless digital media receiver 110, a projector 115, an optional audio speaker 120, an optional cooling fan (or other convective cooling system) 125, an optional motion sensor 130, an audio sensor/receiver 135, and a code compliant electrical interface 140 for a standard or custom pendant light fixture assembly 200. FIG. 1 illustrates the use of an additional projector component 205 that is in wireless or wired communication with the CMPA.

The wireless digital media receiver 110 within the CMPA 100 receives commands and input from any wireless compatible personal electronic device such as a computer, smart phone or tablet. The CPU 105 transmits the signal to the projector 115 to activate it and display the enlarged image 145 on a desired wall or screen surface. The digital media receiver 110 and CPU 105 can also be linked to a wireless router 400 to access the internet and retrieve personal accounts such as electronic calendar information, email, etc. and display it via the projector 115. The audio sensors 135 can receive voice triggers and commands and deliver them to the CPU 105 as well. One or more of the optional motion sensors 130 can activate the CMPA 100, "awaken" it from sleep mode for power and lamp life savings. The CPU 105 also activates the audio speaker 120 to deliver audio output.

The CPU 105 powers and controls the pendant light fixture 200. The CMPA 100 interfaces with a standard (existing or "off the shelf") fixture. The CPU controls on/off and dimming. In another embodiment of the invention, the CMPA fits a custom "intelligent" light fixture. The interface to a custom "intelligent" light fixture may include a USB connection (or wireless connection) as well as electrical power to provide additional lighting effects and projection capability.

Optional wall mounted switch assemblies 300 trigger power to the CMPA 100. Additionally, each switch assembly is equipped with a wireless signal "switch". This sends a wireless command to the digital receiver and CPU specifically to control the pendant light fixture (on/off/dimming). To the user, this simulates a standard light switch with dimming capability.

Figure 2:
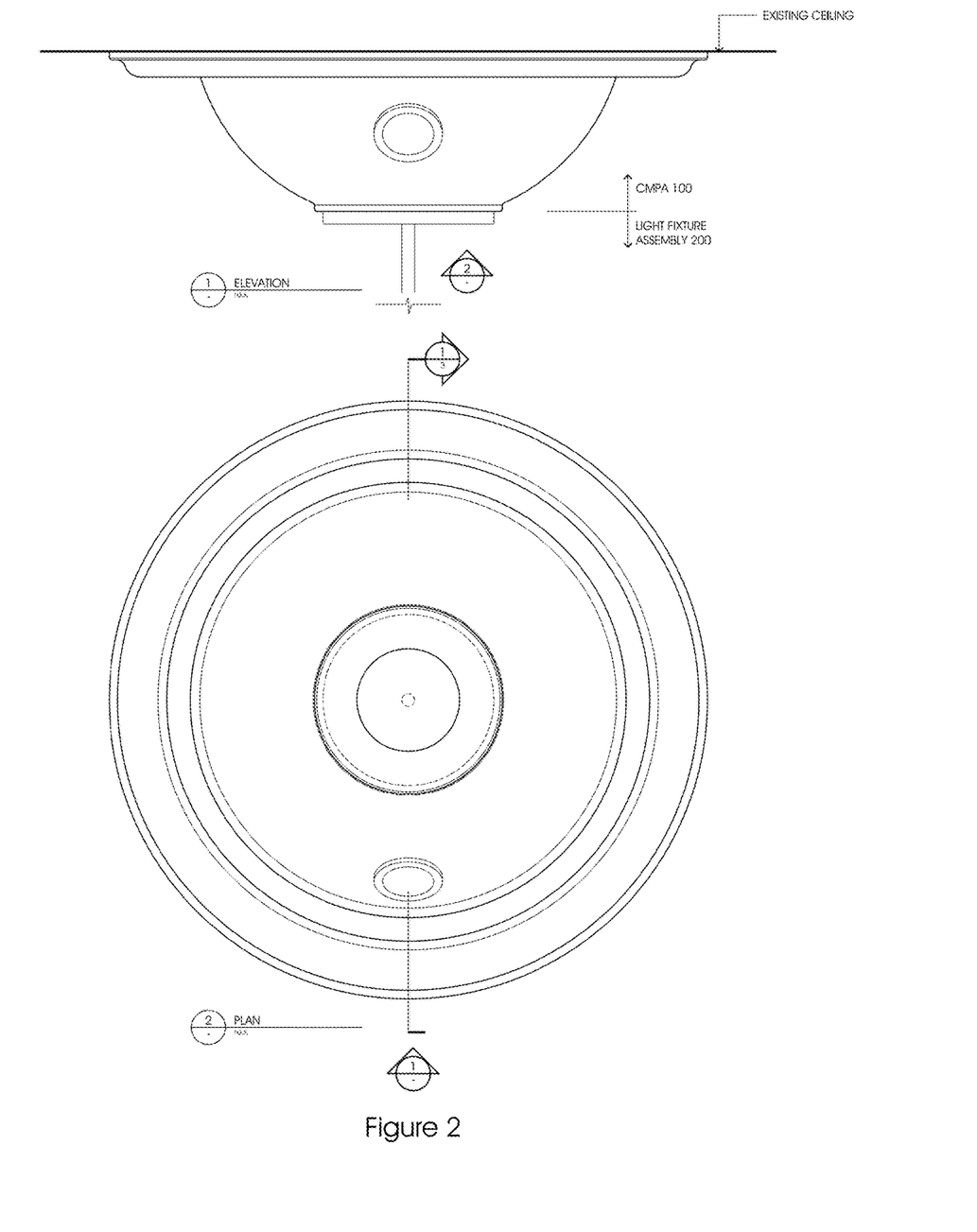
FIG. 2 shows the ceiling medallion projection assembly in elevation and plan.
Figure 3:
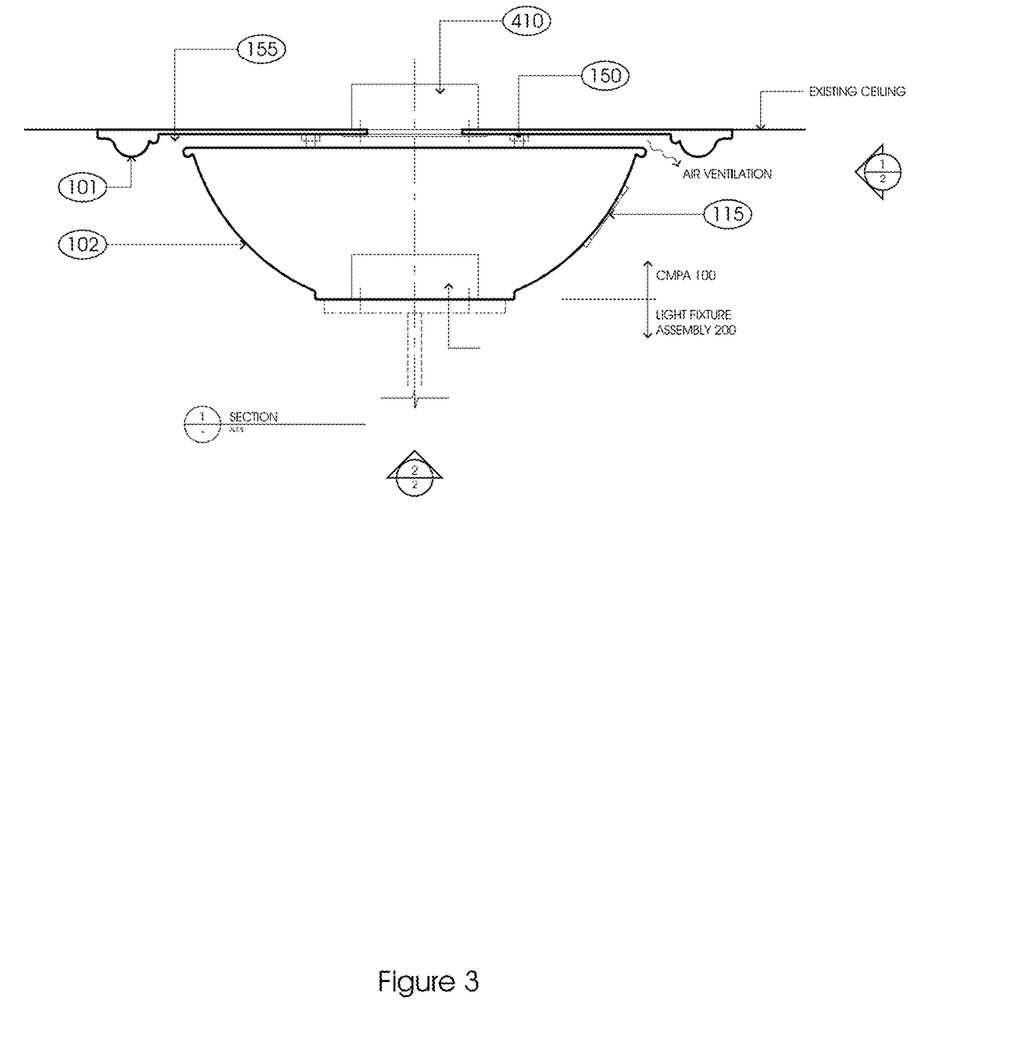
FIG. 3 shows the ceiling medallion projection assembly in section. It is annotated to indicate many of the product features.

The CMPA 100 in its base product form is as shown in FIGS. 2 and 3. It is comprised of two components to aid in wiring and fine positioning. Item 101 is the upper medallion trim component. It includes the electrical interface to the existing ceiling mounted electrical junction box 410. It also includes a mechanical mount and electrical interface 150 for Item 102, the lower medallion projection component. The upper medallion trim component and the lower medallion projection component when used in combination may be termed the CMPA or housing for the assembly. Item 150 includes provision for fine rotational adjustment of the lower projection component to locate the projected image as desired. In an additional embodiment of the invention, this interface can be motorized to orient the projector toward any wall at the will of the user.

The lower medallion projection component 102, houses the CPU 105, the digital media receiver 110, the high definition projector and lens assembly 115, the optional audio speaker(s) 120, the optional cooling fan (or other convective cooling system) 125, the optional motion sensor(s) 130, the optional audio sensor/receiver 135, and a code compliant electrical interface 140 for a standard or custom pendant light fixture assembly 200. The projector and lens assembly 115 is fitted with zoom capability and both horizontal and vertical keystone correction. The lens has a short throw ratio to project a large image from close proximity.

Figure 4:
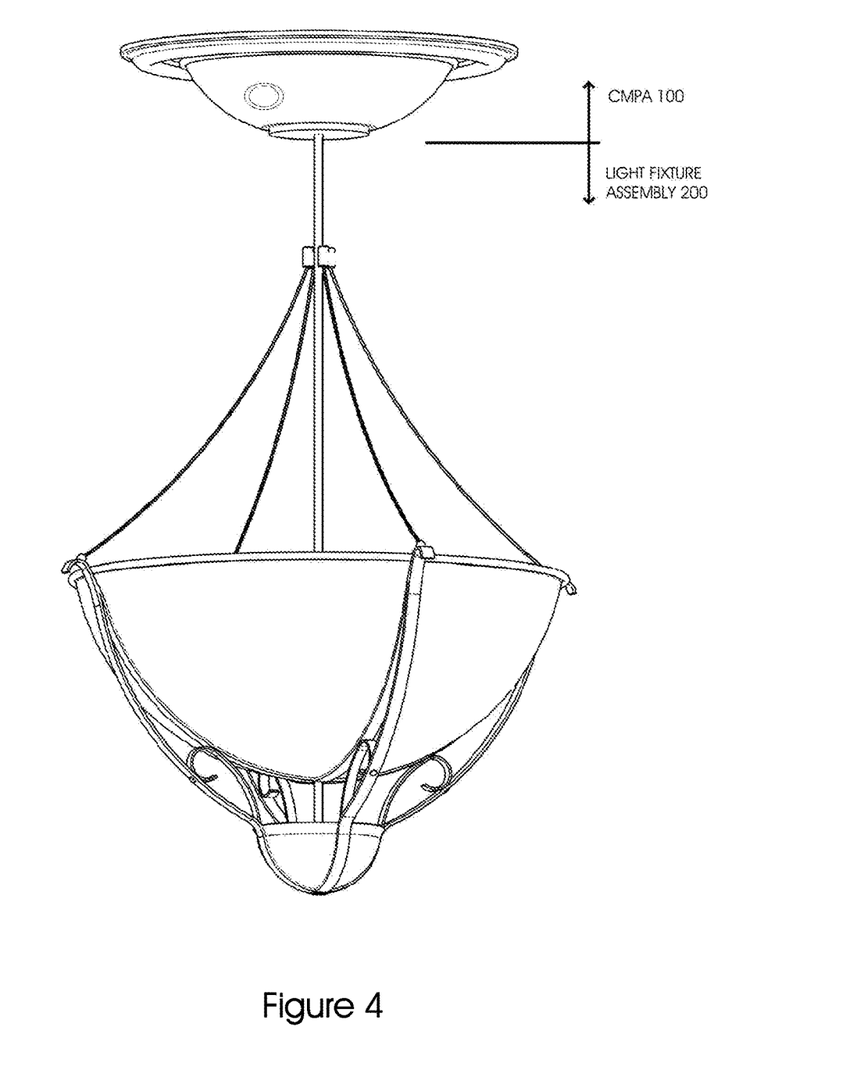
FIG. 4 is a labeled photograph of a prototype design.

The optional continuous peripheral slot 155 accommodates sound projection from the optional audio speaker(s) 120. It also provides ventilation for the expulsion of warm air from the optional cooling system 125. FIG. 4 shows a prototypical CMPA 100 and pendant light fixture assembly 200 in tandem.

Figure 5:
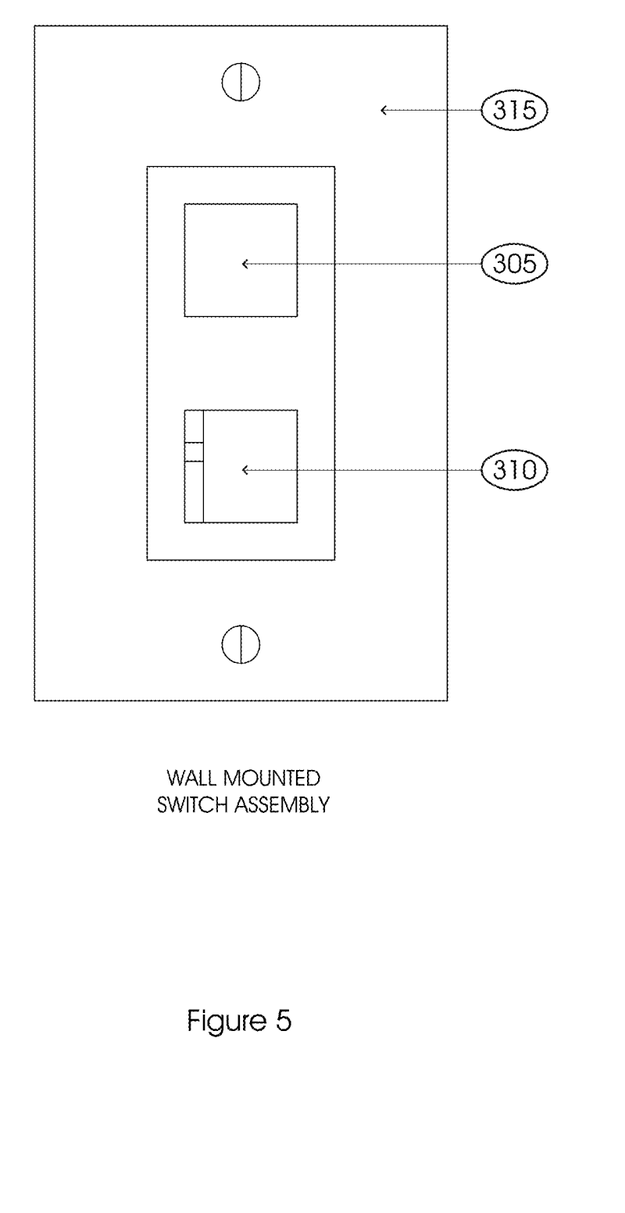
FIG. 5 is a conceptual diagram of the replacement switch required at all locations where a switch was previously located to control the existing light fixture.

FIG. 5 shows an option for a modified operational switch assembly to replace the switch used for the existing ceiling light fixture. It includes an overall system switch 305 that controls power to the CMPA. It is also equipped with a wireless signal "switch" 310 as aforementioned to independently control the pendant light fixture (on/off/dimming). The intent is to allow traditional operation of the light fixture even when the projector is not in use. Item 315 is a switch plate. The switch assembly is intended to be compatible with "off the shelf" switch plates to allow for aesthetic variation by the user.

During installation, the existing pendant light fixture is temporarily removed exposing the ceiling electrical junction box and wires. The upper medallion trim component is installed flush to the ceiling. It is wired to the ceiling junction box per electrical code and then mechanically mounted to the box, similar to the installation of a standard ceiling mounted light fixture. The general positioning of the trim component should be oriented with respect to the desired projection wall within the room. Fine projector positioning is performed later in the installation process.

The lower medallion projection assembly plugs electrically into the upper trim component and is mechanically attached. There is tolerance in the assembly to provide precise orientation of the projector toward the desired wall location. As aforementioned, in an additional embodiment of the invention, the CMPU can be equipped with a rotational motor. This allows the user to direct the projector toward any surface remotely and at his/her whim.

Access is provided to control the projector lens focus and zoom. A short throw ratio is included to create a large image even if the medallion is located close to the wall. Horizontal and vertical keystone correction generates a perfectly proportioned image taking into account that the medallion location is often not centered on, or orthogonal to, the desired image location.

Wiring and a code compliant electrical interface are provided in the medallion assembly. The light fixture can be re-wired and installed to the medallion exactly as it would be to a standard ceiling mounted junction box. Power and dimming of the light fixture are thereafter controlled through the medallion assembly.

The existing light switch (or switches) can be replaced by an optional modified switch assembly as per FIG. 5. This modified switch provides continuous power to the system. System software controls power saving and "sleep" modes. The lighting level is controlled by a "faux" switch that instead sends a wireless signal to the system to turn the light on/off or dim it. This can be done from any of the above mentioned switches, a remote control device or voice actuated command.

The optional gap between the two parts of the assembly may be used to thermally ventilate the projector and provide audio capability when desired. Optional audio and motion control sensors determine whether the projector lamp is on or off to provide energy savings and increased lamp life. In one embodiment of the invention, the assembly can also be commanded by human voice triggered by a target word (perhaps a name). For example, "Francisco . . . what is today's weather?" Such capabilities and level of system intelligence are likely to be determined by product price point and model.

Figure 6:
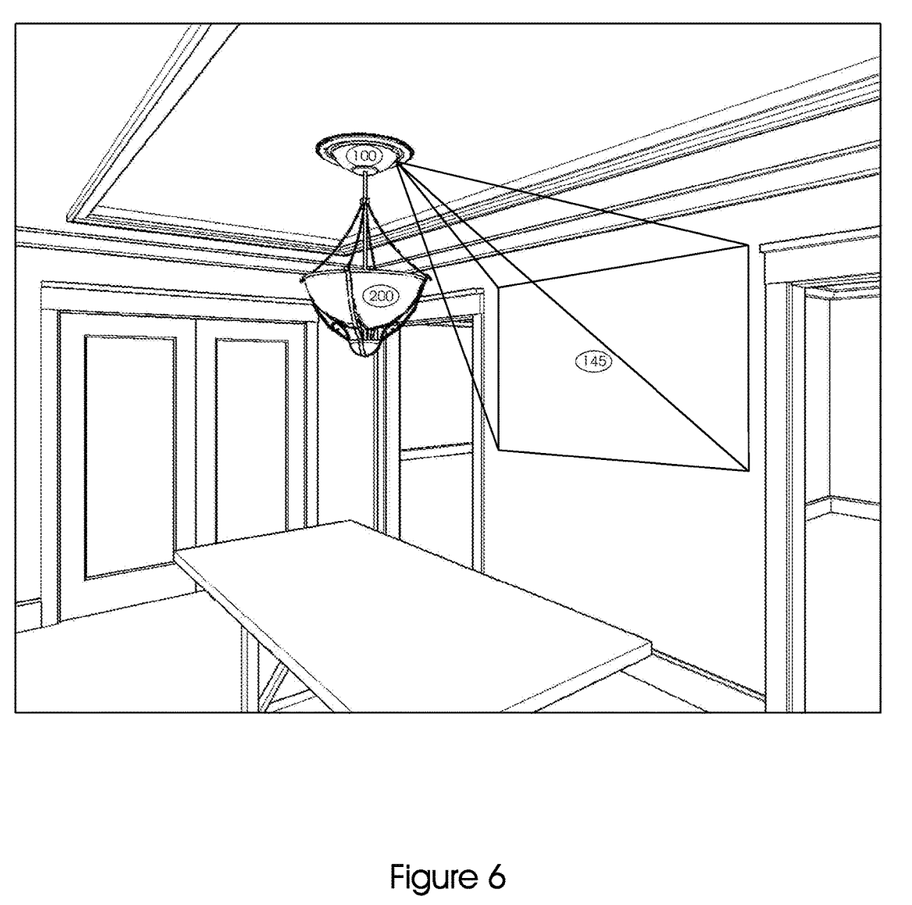
FIG. 6 shows the ceiling medallion projection system in a typical configuration relative to a room in a home or office.
Figure 7:
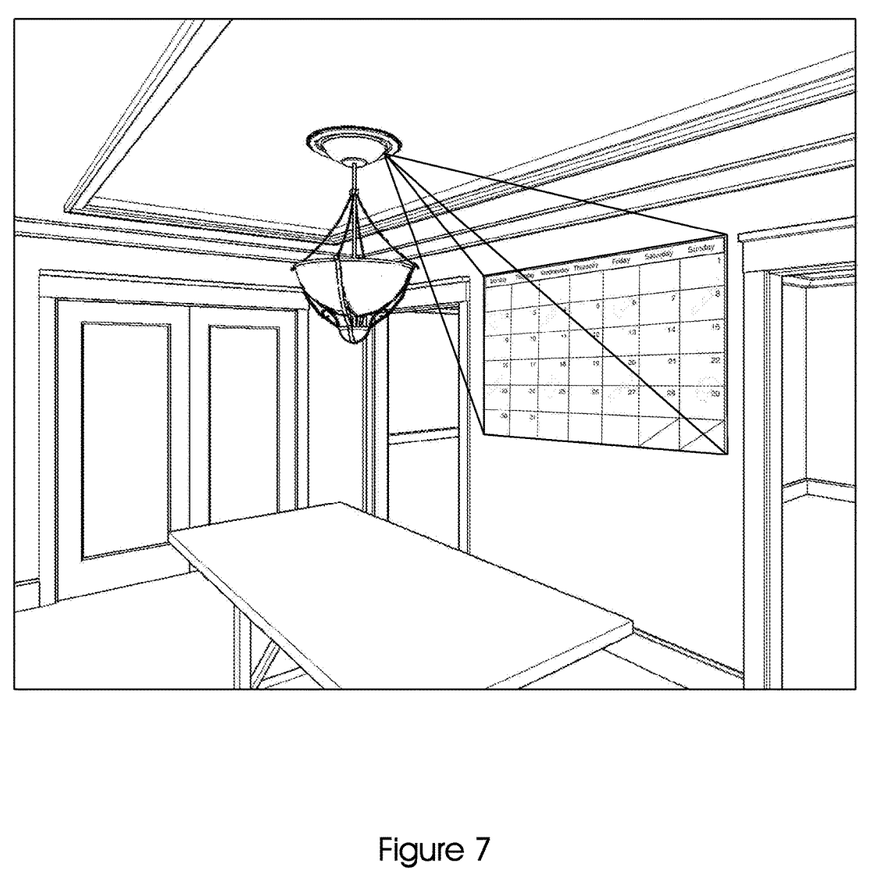
FIG. 7 is a rendered image showing an application of the projection system.

FIG. 6 shows a prototypical CMPA 100 and pendant light fixture assembly 200 as they might be configured relative to a room or office. The CMPA 100 projects a properly proportioned high definition image 145 on an adjacent wall or screen. It provides an interface and control for a light fixture assembly 200 as would be typically installed above a table or gathering space. FIGS. 7 and 8 indicate how the system might appear in use.

Figure 9:
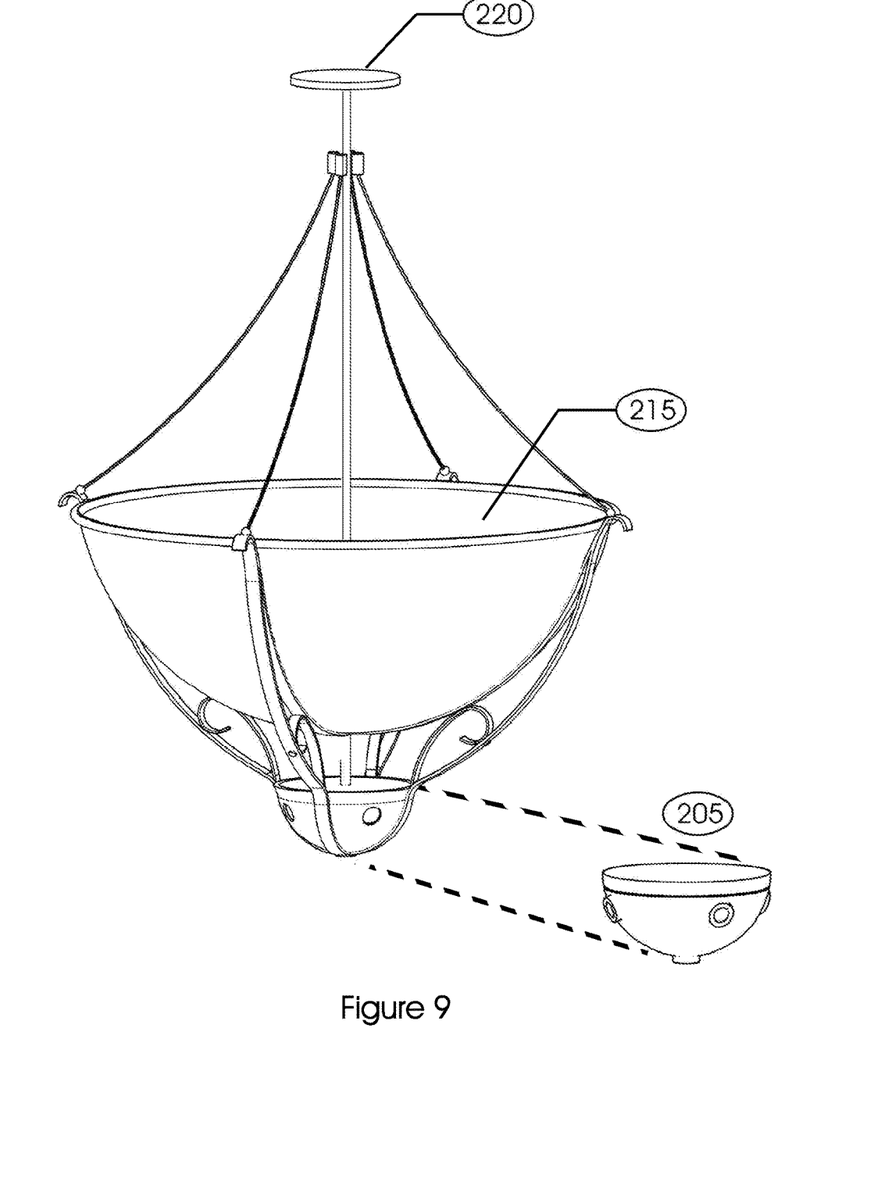
FIG. 9 is a rendered diagram of an enhanced light fixture. Most standard pendant fixtures are compatible with the ceiling medallion projection system. This, an additional embodiment of the invention, is a product that can have programmable LED lighting and additional projection capability.

The ceiling medallion fixture will accommodate most existing pendant fixtures. An additional embodiment of the invention includes provision for "intelligent" pendant light fixtures that can have features beyond that of typical lighting. FIG. 9 shows an enhanced light fixture "intelligently" compatible with the base product medallion assembly to provide additional projection and LED lighting for other optical effects. These would be controlled through a wired USB (or equivalent) or wireless link to the CPU. LED lighting effects can be used for decorative purposes or as reminders such as a soft strobe effect to announce an event. Item 220 indicates the location of the USB (or equivalent) connection and the electrical wiring interface. Item 152 indicates the location for programmable LED lighting together with the standard ambient light source. Item 205 indicates one location for additional projection capability such as for the table surface. FIGS. 8 and 9 show how this may be used to provide an enhanced user experience.

A further embodiment of the invention is to equip the system with the equivalent of "touch screen" capability. In this configuration, the CMPA would include sensors to read human interaction. The wall or screen image would be activated by fingertip via the CPU response.

Referring to FIGS. 6-8, in one application, the CMPA may be used with a cell phone application and/or software for a tablet/laptop/PC. The application or software may include scheduling information for the household in which the CMPA is installed. In a typical scenario, an individual enters the room in which the CMPA is installed. The sensor detects the presence of the individual and sends a signal to the CPU of this detection. Based on this signal, the CPU has software that simultaneously (or effectively simultaneously to the individual in the room) seeks and receives data from the application on the individual's smart phone via the digital media receiver to update a calendar programmed in the CPU software. The CMPA then provides power and digital content to the projector which, in turn, projects an updated calendar on a wall or surface.

The digital media receiver within the CMPA is also linked to the home or office router and can download information (e.g. calendar, email, internet) from this router and/or other routers in range. Similar to above, this information can be transmitted to the CPU which then supplies power and content to the projector. In one embodiment of the invention, the CPU has software that can direct a voice actuated request from the user via the audio receiver and, in turn, seek the information via the digital media receiver and router. In such an instance, no other external device such as a phone, tablet or computer need be detected. Any information available via the router (e.g. internet, cloud), can be retrieved based on a spoken request.

The CMPA, like a smart phone, can be equipped with an "address" to which text messages and images can be delivered and subsequently retrieved. Software within the CPU manages the information and delivers it to the projector when an individual is detected within the room. In one embodiment, the CPU can direct the speaker to deliver a tone indicating a message has been received. This may alert someone elsewhere in the house that a message has been sent. Messaging to the CMPA is a good way to deliver information to the family as a whole as opposed to individually through personal phones. Some family members may not have a phone. Some may have dexterity issues (such as the elderly) making phone use difficult. Some may have vision disabilities that make small text difficult to read. In this manner, the ceiling medallion projection system may be a useful communication tool for the elderly or disabled living independently.

FIG. 6 illustrates the CMPA projection capability onto a wall in a room. FIGS. 7 and 8 illustrate the use of the CMPA to project a calendar (FIG. 7) or a to-do list (FIG. 8) on a wall. As one might anticipate, the individual may be informed of medicines to take, homework to start, cooking or household chores to undertake, etc. In general, the display of the calendar on the wall or surface is not limited to merely a calendar format but may include a listing of other tasks, reminders, etc. relevant to that individual. The software programmed on the CPU may be such that the information displayed is specific to the individual in the room based on detecting that person's smart phone and displaying information pulled from that smart phone. In another embodiment, such personally specific information might be displayed based on the detection of the individual's voice or recitation of his or her name. In another embodiment, the software may be an aggregator of information from any smart phone in the household that includes the cell phone application or a cell phone application that communicates data relating to calendar entries, tasks, reminders, and the like. In this manner all individuals in the household will know where one member of the household is and when they will be expected to be at any particular location. The software in the CPU and smart phone may have the functionality to interface with a tablet, laptop or PC to update the calendar items, tasks and reminders in that manner.

Figure 10:
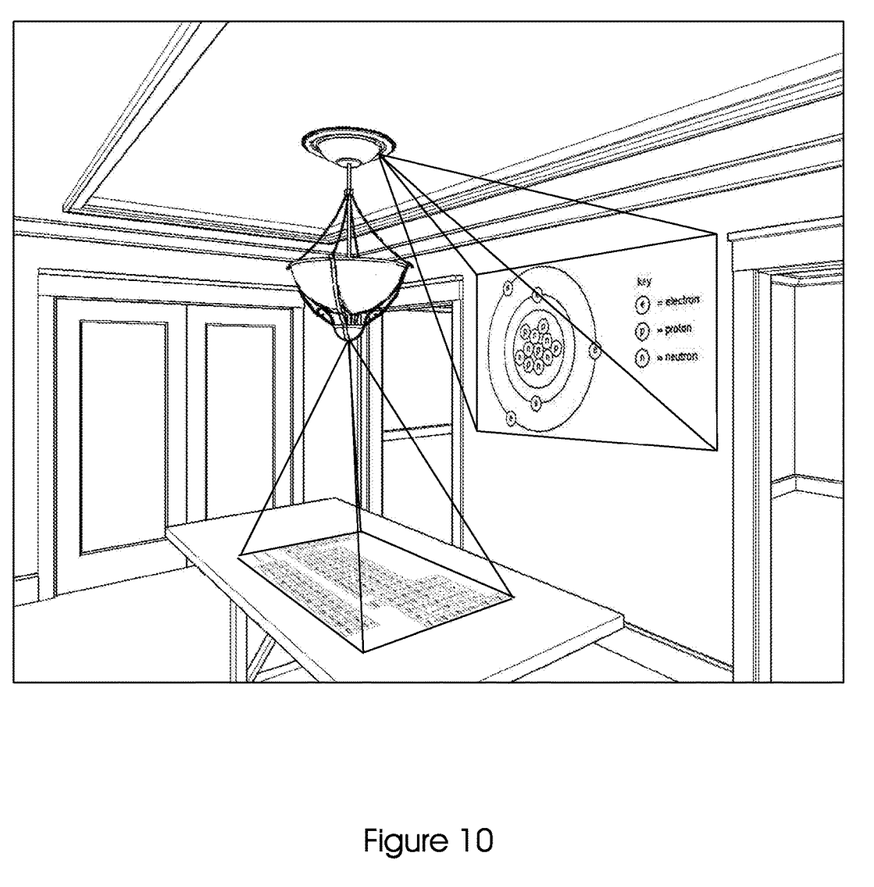
FIG. 10 is a rendered image showing an application of the projection system with the enhanced light fixture.
Figure 11:
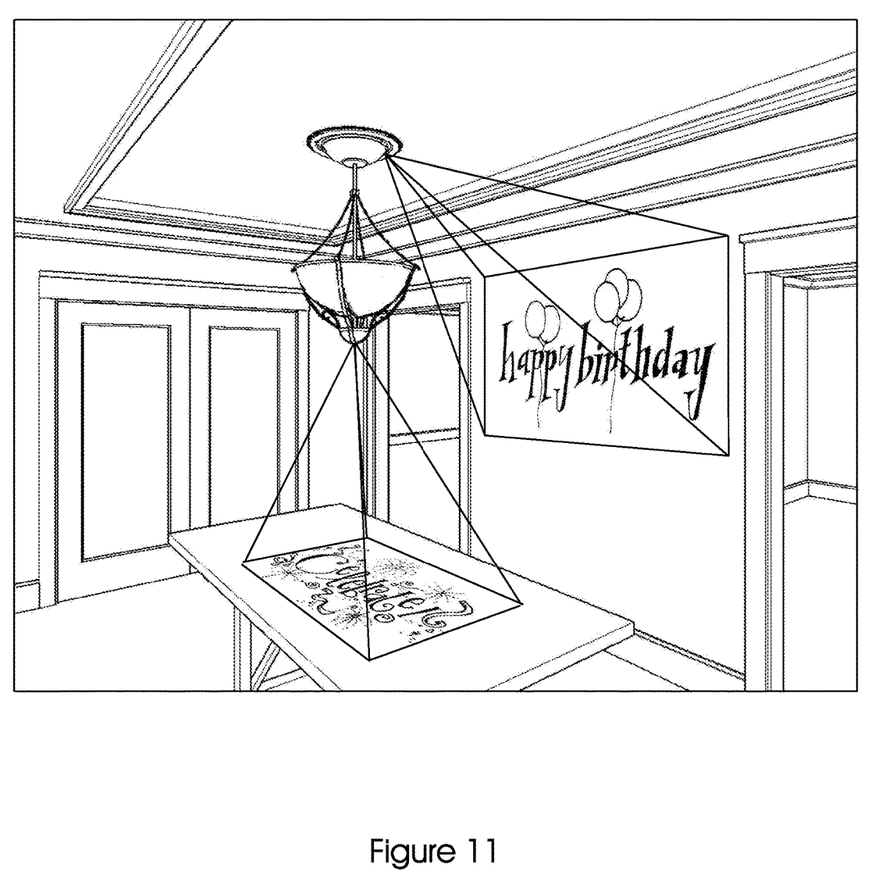
FIG. 11 is an additional rendered image showing an application of the projection system with the enhanced light fixture.

The functionality of the CMPA is of course not limited to calendar displays, schedules or other organizational tools. One of skill in the art would readily use the CMPA for any display that can be wirelessly (or through wired transmission of data) connected to a router or personal computing device, such as a smart phone, tablet, laptop, PC etc. Thus, the CMPA may be used to give a presentation using known presentation software, to display photographs stored digitally, to display videos from the internet or a DVD used in the computing device, and the like. For example, the CMPA may be advantageously used to assist in studying. FIG. 10 illustrates the CMPA being used as a study aid, displaying the periodic table of elements and an atomic structure diagram on a table and wall, for example. FIG. 11 illustrates the CMPA being used to project a birthday message to a member of the household.

In another implementation the CMPA may be used as a home entertainment center in conjunction with, for example, a laptop to watch video from either a streaming source or a DVD, CD or the like. In this manner, the CMPA advantageously can be used to replace a conventional television or display with the projection of content and thereby enhance the aesthetics of a room.

The invention claimed is:

1. A ceiling medallion projection assembly (CMPA) comprising:
    a housing comprising an upper medallion trim component and a lower medallion projection component and hardware for mounting a pendant light fixture to the housing;
    a computer processing unit (CPU);
    a wireless digital media receiver;
    a projector;
    an electrical interface for a pendant light fixture;
    a cooling system;
    a switch assembly in communication with the digital media receiver; and
    a pendant light fixture mounted outside and below the housing of the CMPA,
    wherein the CPU, the wireless digital media receiver, the projector, the electrical interface for the pendant light fixture and the cooling system are positioned within the housing,
    wherein the CPU receives data from a router or computing device, transforms that data and causes the projector to project an image on a surface that is a product of the transformation of that data.

2. The ceiling medallion projection assembly of claim 1, wherein the assembly consists of the housing, the computer processing unit, the wireless digital media receiver, the projector, the electrical interface for a pendant light fixture, the cooling system, the switch assembly in communication with the digital media receiver; and the pendant light fixture mounted to and outside of the housing.

3. A ceiling medallion projection assembly (CMPA) comprising:
    a housing comprising an upper medallion trim component and a lower medallion projection component;
    a computer processing unit (CPU);
    a wireless digital media receiver;
    a first projector;
    a second projector;
    an electrical interface for a pendant light fixture;
    a switch assembly in communication with the digital media receiver; and
    a pendant light fixture mounted to and outside of the housing,
    wherein the CPU, the wireless digital media receiver, the first projector, and the electrical interface for the pendant light fixture are positioned within the housing, and
    the second projector is positioned outside the upper medallion trim component and the lower medallion projection component and is in wireless or wired communication with the CMPA,
    wherein the CPU receives data from a router or computing device, transforms that data and causes the projector to project an image on a surface that is a product of the transformation of that data.

4. The ceiling medallion projection assembly of claim 1, further comprising an audio speaker contained within the housing.

5. The ceiling medallion projection assembly of claim 1, wherein the upper medallion trim component and the lower medallion projection component contain the CPU, the wireless digital media receiver, and the first projector, and the ceiling medallion projection assembly further comprises a second projector component positioned outside the upper medallion trim component and the lower medallion projection component and in wireless or wired communication with the CMPA.

6. The ceiling medallion projection assembly of claim 1, further comprising an audio speaker, a motion sensor, and an audio sensor/receiver positioned within the housing,
    wherein the CPU receives data from a router or computing device, transforms that data and causes the projector to project an image on a wall that is a product of the transformation of that data.

7. A method for mounting the ceiling medallion projection assembly of claim 1, the method comprising:
    providing the ceiling medallion projection assembly of claim 1;
    mounting the ceiling medallion projection assembly to a ceiling;
    creating an electrical connection between the assembly and a source of electrical power; and
    mounting a pendant light fixture to the assembly.

8. A method of projecting content on a surface using the ceiling medallion projection assembly of claim 1, the method comprising: activating the ceiling medallion projection assembly, whereby activating the assembly causes the projector to power on a projector lamp and display content on a surface using the projector lamp.

9. The method of claim 8, wherein causing the projector to power on a projector lamp comprises:
   receiving a signal at the digital media receiver from a wireless computing device;
   causing a signal to be transmitted from the digital media receiver to the CPU; and
   causing a signal to be transmitted from the CPU to the projector to power on the projector lamp.

10. The method of claim 9, wherein the content displayed on the surface by the projector is a function of one or more of the time of day, the wireless computing device from which a signal has been received by the digital media receiver, and user selected content.

11. The method of claim 9, wherein the wireless computing device comprises one or more of a tablet, laptop, personal computer, and smart phone.

12. The method of claim 8, wherein the surface comprises one or more of a wall, table top, ceiling, floor, and screen.

13. The method of claim 8, wherein the CPU and wireless computing device communicate content between the wireless computing device and the CPU.

14. The method of claim 13, wherein the content is one or more of a calendar, task list, reminders, notifications, video streaming, presentation, screen display, and audio/video app.

15. The method of claim 8, wherein the display of content further comprises audio associated with the content.

16. The ceiling medallion projection assembly of claim 1, further comprising an audio sensor/receiver and a motion sensor positioned within the housing.

17. The ceiling medallion projection assembly of claim 3, wherein the CPU receives data from a router or computing device, transforms that data and causes the projector to project an image on a wall that is a product of the transformation of that data.

* * * * *